(12) United States Patent
Son et al.

(10) Patent No.: US 10,667,643 B2
(45) Date of Patent: Jun. 2, 2020

(54) COFFEE EXTRACTION DEVICE AND METHOD

(71) Applicant: COWAY CO., LTD., Chungcheongnam-do (KR)

(72) Inventors: Tae-Yong Son, Seoul (KR); Dong-Min Oh, Seoul (KR)

(73) Assignee: Coway Co., Ltd (KR)

( * ) Notice: Subject to any disclaimer, the term of this patent is extended or adjusted under 35 U.S.C. 154(b) by 200 days.

(21) Appl. No.: 15/510,471

(22) PCT Filed: Sep. 11, 2015

(86) PCT No.: PCT/KR2015/009575
§ 371 (c)(1),
(2) Date: Mar. 10, 2017

(87) PCT Pub. No.: WO2016/039581
PCT Pub. Date: Mar. 17, 2016

(65) Prior Publication Data
US 2017/0290457 A1    Oct. 12, 2017

(30) Foreign Application Priority Data
Sep. 12, 2014    (KR) ........................ 10-2014-0121255

(51) Int. Cl.
*A47J 31/36*    (2006.01)
*A47J 31/40*    (2006.01)
(Continued)

(52) U.S. Cl.
CPC ................ *A47J 31/36* (2013.01); *A23F 5/26* (2013.01); *A47J 31/3623* (2013.01);
(Continued)

(58) Field of Classification Search
CPC .......... A47J 31/36; A47J 31/407; A47J 31/52; A47J 31/3623; A47J 31/3676; A47J 31/4403; A23F 5/26
(Continued)

(56) References Cited

U.S. PATENT DOCUMENTS 8,245,628 B2 * 8/2012 Magg ...................... A47J 31/36
                                              219/433
8,393,975 B2    3/2013 Widanagamage Don
(Continued)

FOREIGN PATENT DOCUMENTS

DE    20 2011 001 661    7/2011
EP        1 827 180       9/2007
(Continued)

OTHER PUBLICATIONS

European Search Report dated Oct. 13, 2017 issued in counterpart application No. 15840068.9-1656, 8 pages.
(Continued)

*Primary Examiner* — Lorne E Meade
*Assistant Examiner* — Kuangyue Chen
(74) *Attorney, Agent, or Firm* — The Farrell Law Firm, P.C.

(57) ABSTRACT

Provided are a coffee extraction device and a coffee extraction method, which are capable of extracting coffee from a coffee capsule (capsule coffee) and the like. The coffee extraction device can comprise: a coffee extraction unit on which a coffee capsule is to be mounted; a pump for pressurizing water and supplying the same to the coffee extraction unit; a flow rate sensor for measuring the flow rate of water to be supplied to the coffee extraction unit; and a control unit for controlling the operation of the pump on the basis of the flow rate to be sensed at the flow rate sensor.

7 Claims, 5 Drawing Sheets

(51) Int. Cl.
  *A47J 31/44* (2006.01)
  *A23F 5/26* (2006.01)
  *A47J 31/52* (2006.01)
(52) U.S. Cl.
  CPC ......... *A47J 31/3676* (2013.01); *A47J 31/407* (2013.01); *A47J 31/4403* (2013.01); *A47J 31/52* (2013.01)
(58) Field of Classification Search
  USPC .......................................................... 99/295
  See application file for complete search history.

(56) References Cited

U.S. PATENT DOCUMENTS

| | | | |
|---|---|---|---|
| 8,951,020 B2* | 2/2015 | Piai | F04B 49/06 |
| | | | 417/12 |
| 2005/0150391 A1 | 7/2005 | Schifferle | |
| 2005/0188854 A1* | 9/2005 | Green | A47J 31/002 |
| | | | 99/275 |
| 2006/0249030 A1 | 11/2006 | Blenvenu et al. | |
| 2010/0107887 A1* | 5/2010 | Bentley | A47J 31/44 |
| | | | 99/288 |
| 2010/0263543 A1* | 10/2010 | Krauchi | A47J 31/4403 |
| | | | 99/280 |
| 2011/0094389 A1 | 4/2011 | Coccia | |
| 2011/0113971 A1* | 5/2011 | Aemisegger | A47J 31/4403 |
| | | | 99/302 R |
| 2011/0132925 A1 | 6/2011 | Ozanne | |
| 2011/0271843 A1 | 11/2011 | Cheng et al. | |
| 2013/0236609 A1* | 9/2013 | Magniet | A47J 31/369 |
| | | | 426/87 |
| 2013/0327222 A1 | 12/2013 | Mahlich | |
| 2014/0287104 A1* | 9/2014 | Austin | B65D 85/8043 |
| | | | 426/115 |
| 2014/0325961 A1* | 11/2014 | Yokota | F01N 3/208 |
| | | | 60/274 |
| 2014/0373722 A1* | 12/2014 | Talon | A47J 31/0668 |
| | | | 99/280 |
| 2016/0000252 A1* | 1/2016 | Olsen | A47J 31/002 |
| | | | 426/231 |
| 2017/0290457 A1* | 10/2017 | Son | A47J 31/36 |

FOREIGN PATENT DOCUMENTS

| | | |
|---|---|---|
| JP | 3770166 | 4/2006 |
| KR | 1020050074908 | 7/2005 |
| KR | 2020110010665 | 11/2011 |
| KR | 1020120117529 | 10/2012 |
| WO | WO 98/27854 | 7/1998 |
| WO | WO 2006/050856 | 5/2006 |
| WO | WO 2007/110768 | 10/2007 |
| WO | WO 2013/080073 | 6/2013 |

OTHER PUBLICATIONS

Chinese Office Action dated Jul. 18, 2019 issued in counterpart application No. 201580048880.2, 10 pages.

* cited by examiner

COFFEE EXTRACTION DEVICE AND METHOD

PRIORITY

This application is a National Phase Entry of PCT International Application No. PCT/KR2015/009575, which was filed on Sep. 11, 2015, and claims priority to Korean Patent Application No. 10-2014-0121255, which was filed on Sep. 12, 2014, the contents of each of which are incorporated herein by reference.

TECHNICAL FIELD

The present disclosure relates to a coffee extraction device and a coffee extraction method in which coffee may be extracted from a coffee capsule (capsule coffee) or the like.

BACKGROUND ART

As daily life and social life progress and tasks performed therein become specialized, a great number of devices used simply and efficiently in life have been developed, and in this regard, coffee extraction devices such as coffee makers and the like are devices able to be used simply and effectively in daily life.

Coffee extraction devices referred to as capsule coffee machines are devices producing liquid beverages from capsules containing beverage powders such as black tea, cocoa, and the like, as well as coffee, from which liquid beverages are extracted by supplying high-temperature, high-pressure water and steam to capsules installed in capsule extraction units.

However, in related art coffee extraction devices, when high-pressure water and steam is supplied to coffee powder contained in capsules, a blockage phenomenon in which powder is compressed at high pressure may occur, such that coffee may not be able to be extracted.

For example, coffee powder contained in coffee capsules may form a blockage under high pressure during coffee extraction to thus block extraction paths. In the case of such a blockage phenomenon, it may be difficult to extract coffee, even when high-pressure pumps are operated.

In the case of such a blockage phenomenon, a problem in which high pressure pumps fail due to an excessive load applied thereto may occur, and furthermore, coffee capsules (capsule coffee) having abnormality in extraction function cannot be used and should be discarded.

Further, when users forcibly open coffee extraction units, a safety problem in which high-temperature, high-pressure water and steam may be released externally, may occur.

(Patent Document 1) Korean Utility Model Laid-Open Publication No. 2011-0010665 (Published on Nov. 15, 2011)

DISCLOSURE

Technical Problem

An aspect of the present disclosure to solve at least some of the problems of the related art as described above is to provide a coffee extraction device and a coffee extraction method in which coffee may be stably extracted even when a blockage phenomenon occurs in coffee powder contained in a coffee capsule.

Technical Solution

According to an aspect of the present disclosure, a coffee extraction device includes a coffee extraction unit in which a coffee capsule is mounted; a pump pressurizing water and supplying the water to the coffee extraction unit; a flow rate sensor measuring a flow rate of the water supplied to the coffee extraction unit; and a control unit controlling driving of the pump, based on the flow rate sensed by the flow rate sensor.

The control unit may stop the pump and then redrive the pump, when the flow rate sensed by the flow rate sensor is lower than a preset flow rate.

The control unit may perform controlling to apply a second voltage, higher than a first voltage applied to the pump at the time of initial driving of the pump, to the pump during at least a portion of a voltage application period of time when the pump is redriven. In this case, the control unit may perform controlling to apply a third voltage, lower than the second voltage to the pump after applying the second voltage to the pump for a preset period of time, when the pump is redriven. In this case, the third voltage may have a level equal to or higher than a level of the first voltage.

The control unit may stop the pump for a preset period of time and then redrive the pump at the time of a redriving of the pump, when the flow rate sensed by the flow rate sensor is lower than the preset flow rate. In this case, when the number of redriving operations of the pump is equal to or greater than a preset number, the control unit may notify a user of abnormality in a coffee extraction function.

The coffee extraction device may further include a heater installed on a flow path between the pump and the coffee extraction unit to heat the water supplied to the coffee extraction unit.

According to another aspect of the present disclosure, a coffee extraction method includes a pump driving process of driving a pump to supply high-pressure water to a coffee capsule; and a re-extraction process of stopping driving of the pump and then performing redriving of the pump when a flow rate of water supplied to the coffee capsule is lower than a preset flow rate.

The re-extraction process may be performed, when the flow rate of the water supplied to the coffee capsule is lower than the preset flow rate, after the pump driving process is performed for a preset pump driving period.

The re-extraction process may be repeatedly performed, when the flow rate of the water supplied to the coffee capsule is lower than the preset flow rate after the re-extraction process is performed.

The coffee extraction method may further include a process of displaying abnormality present in a coffee extraction function when the number of the re-extraction processes is equal to or greater than a preset number.

According to another aspect of the present disclosure, a coffee extraction method includes a pump driving process of driving a pump to supply high-pressure water to a coffee capsule; and a re-extraction process of stopping driving of the pump and then performing redriving of the pump when a water amount supplied to the coffee capsule does not reach a preset water amount within a preset time.

The re-extraction process may be performed by applying a second voltage, higher than a first voltage applied to the pump in the pump driving process, to the pump during at least a portion of a voltage application period of time of voltage applied to the pump. The re-extraction process may be performed by applying a third voltage, lower than the second voltage to the pump after applying the second voltage to the pump for a second voltage setting period of time. The third voltage may have a level equal to or higher than a level of the first voltage.

The coffee extraction method may further include an initial pump driving process of stopping the pump after driving the pump for a preset initial driving period before the pump driving process.

Advantageous Effects

According to an exemplary embodiment providing the configuration as above, stable coffee extraction may be performed even when a blockage phenomenon occurs in coffee powder contained in a coffee capsule by changing pressure of water and steam supplied to the coffee capsule.

In detail, the pressure of water and steam supplied to a coffee capsule may be changed by changing a level of voltage applied to a pump, and thus, liquid coffee may be extracted even when a blockage phenomenon occurs in coffee powder.

In addition, according to an exemplary embodiment in the present disclosure, whether a blockage phenomenon has occurred in a coffee capsule may be determined through flow-rate sensing using a flow rate sensor, and the blockage phenomenon may be removed.

According to an exemplary embodiment in the present disclosure, the driving of a pump may be stopped and the pump may then be redriven to remove a blockage phenomenon or to allow for formation of a flow path in a region in which a blockage phenomenon does not occur, and thus, stable coffee extraction may be performed.

DESCRIPTION OF REFERENCE NUMERALS

100 . . . Coffee Extraction Device
110 . . . Flow Rate Sensor
120 . . . Pump
130 . . . Heater
140 . . . Coffee Capsule
141 . . . Capsule Body Portion
143 . . . Upper Cover
144 . . . Lower Cover
145 . . . Coffee Powder
150 . . . Coffee Extraction Unit
151 . . . Upper Punching Mechanism
152 . . . Lower Punching Mechanism
160 . . . Control Unit
170 . . . Display Unit

BEST MODE

Hereinafter, exemplary embodiments in the present disclosure will be described with reference to the accompanying drawings. However, the exemplary embodiments in the present disclosure may be variously modified and are not limited to descriptions below. In addition, exemplary embodiments are provided to more fully describe the present invention to those skilled in the art. The shapes, sizes and the like of elements in the drawings may be exaggerated for ease of explanation.

Furthermore, as used herein, the singular forms are intended to include the plural forms as well, unless the context clearly indicates otherwise.

In a coffee extraction device and a coffee extraction method according to an exemplary embodiment in the present disclosure, liquid beverages may be extracted from various types of capsules containing various beverage powders, such as black tea, cocoa, and the like as well as coffee. In this specification including the claims, although the case of extracting liquid coffee from a coffee capsule is provided by way of example, a capsule used in a coffee extraction device and a coffee extraction method according to exemplary embodiments is not limited to a coffee capsule, and capsules containing various powders for beverage extraction may be used.

Hereinafter, a coffee extraction device and a coffee extraction method according to an exemplary embodiment in the present disclosure will be described with reference to the accompanying drawings.

[Coffee Extraction Device]

First, a coffee extraction device 100 according to an exemplary embodiment will be described with reference to FIGS. 1, 5, and 6.

Figure 1:
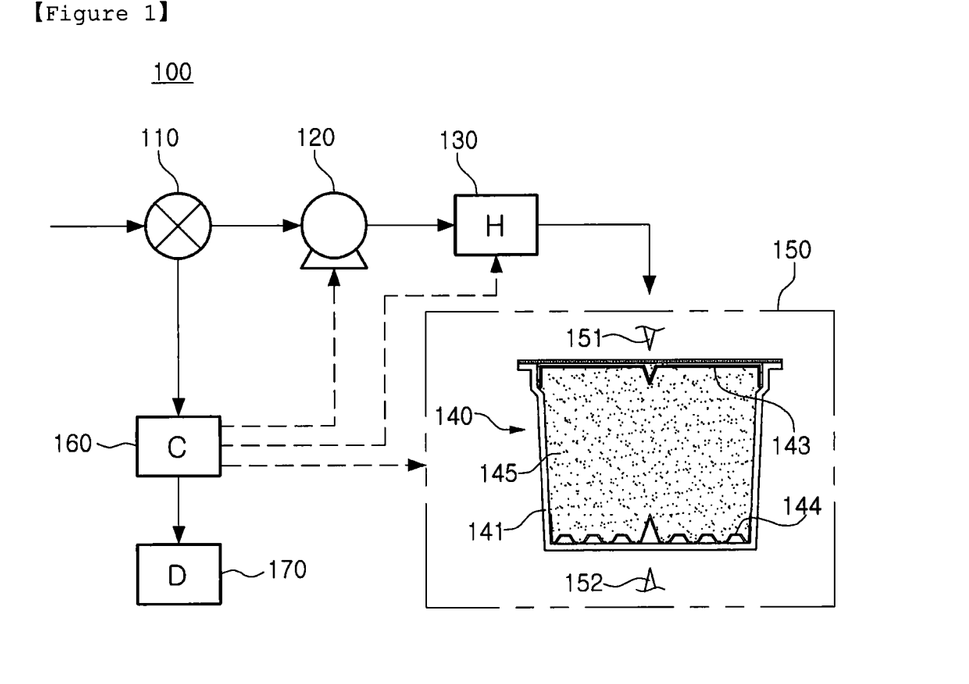
FIG. 1 is a schematic diagram of a coffee extraction device according to an exemplary embodiment in the present disclosure.

As illustrated in FIG. 1, a coffee extraction device 100 according to an exemplary embodiment may include a coffee extraction unit 150 in which a coffee capsule 140 is mounted, a pump 120 pressurizing water and supplying the water to the coffee extraction unit 150, a flow rate sensor 110 measuring a flow rate of water supplied to the coffee extraction unit 150, and a control unit 160 controlling driving of the pump 120 based on the flow rate sensed by the flow rate sensor 110. The coffee extraction device 100 may further include a heater 130 installed to heat water supplied to the coffee extraction unit 150, and a display unit 170 providing a notification to a user.

The flow rate sensor 110 may measure a flow rate of water supplied to the coffee extraction unit 150. The flow rate sensor 110 may be configured to allow for flow measurement of a relatively low flow rate, for example, 1 LPM or less, in consideration of a relatively small extraction amount by the coffee extraction unit 150.

In addition, the pump 120 may be configured to supply high pressure, for example, 7 to 10 bars, to the coffee extraction unit. Since the structure of such a high-pressure pump is commonly used in the art, a detailed description thereof will be omitted.

The heater 130 may be configured to heat water introduced thereinto to be supplied to the coffee extraction unit as high temperature water or steam. The heater 130 may be configured to withstand relatively high pressure of the pump 120, and as the heater, a die-casting heater may be used by way of example.

Such a die casting heater may be a die-cast heater formed of a material having relatively high thermal conductivity, such as aluminum or the like, in a state in which the heater 130 and a pipe in which water flows are arranged, and since the pipe is installed inside die-cast metal, the die-casting heater may be stably used even in a high-pressure environment.

However, the heater 130 used according to an exemplary embodiment in the present disclosure is not limited to the above-described die casting heater, and various heaters 130 commonly used in the art may be used as long as the heaters are usable in a high pressure environment of, for example, 7 to 10 bars.

The coffee extraction unit 150 may be provided with a capsule mounting portion (not shown) in which the coffee capsule 140 is mounted, and may extract liquid coffee by supplying high-pressure water (or steam) to the coffee capsule 140. On the other hand, in this specification, although it is described that 'water' is supplied to the coffee extraction unit 150 for ease of explanation, for example, when water heated in a heater is supplied at high pressure, the water is changed to steam and may be supplied to the coffee extraction unit 150. Thus, in the present specification including claims, 'water' supplied to the coffee extraction unit 150 is defined as including steam and may only be provided as steam.

In addition, an upper punching mechanism 151 puncturing an upper portion of the coffee capsule 140 may be provided above the coffee capsule 140, to allow the water pressurized by the pump 120 to be introduced into the coffee capsule 140. In addition, a lower punching mechanism 152 puncturing a lower portion of the coffee capsule 140 may be provided below the coffee capsule 140, to allow coffee powder 145 and high-pressure water inside the coffee capsule 140 to be in contact with each other and to be supplied to a user through a punctured portion thereof.

In addition, the coffee capsule 140 may have a structure in which the coffee powder 145 is accommodated in a capsule body portion 141 as illustrated in FIG. 1 by way of example, and may be provided with an upper cover 143 and a lower cover 144 on upper and lower portions thereof, respectively, to protect the coffee powder 145 accommodated in the inside of the coffee capsule. However, the coffee capsule 140 used in an exemplary embodiment is not limited to the structure illustrated in FIG. 1, and a capsule commonly used in the art in which the coffee powder 145 is accommodated may be used.

On the other hand, the control unit 160 may control driving of the pump 120, based on a flow rate sensed by the flow rate sensor 110.

For example, when the flow rate sensed by the flow rate sensor 110 is lower than a preset flow rate, it may indicate that the flow rate of water supplied to the coffee extraction unit 150 is extremely small or there is no water supplied thereto, which may be determined as the occurrence of a blockage phenomenon caused by high-pressure water inside the coffee capsule 140.

Thus, for example, when the flow rate detected by the flow rate sensor 110 is lower than the preset flow rate, the control unit 160 may control the driving of the pump 120 to solve the blockage phenomenon.

In detail, for example, when the flow rate detected by the flow rate sensor 110 is lower than the preset flow rate, the control unit 160 may control the pump 120 to be stopped and then redriven.

For example, when the driving of the pump 120 is stopped for a preset period of time, a level of pressure applied to the coffee capsule 140 may be lower than the pressure provided before the pump 120 is stopped. In this state, when the pump 120 is redriven, a level of the pressure applied to the coffee powder 145 may be varied, thereby changing a pressure distribution or an arrangement state of the powder. Thus, stable extraction may be performed by eliminating the blockage phenomenon or allowing a flow path to be formed in a region in which the blockage phenomenon does not occur, via the redriving of the pump after the pump 120 is stopped.

Figure 5:
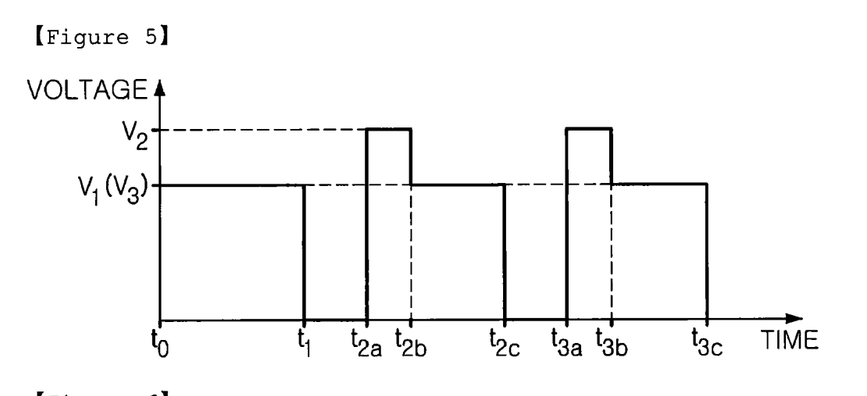
FIGS. 5 and 6 are graphs illustrating various examples of changes in a voltage applied to a pump in a coffee extraction method according to an exemplary embodiment in the present disclosure.
Figure 6:
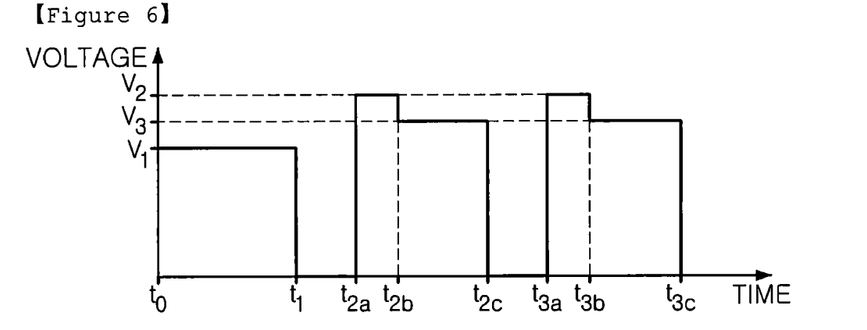

In this case, the control unit 160 may perform controlling to apply a second voltage $V_2$, higher than a first voltage $V_1$ applied to the pump 120 at the time of initial driving of the pump 120, to the pump 120, during at least a portion $t_{2a}$ to $t_{2b}$ of a voltage application period of time $t_{2a}$ to $t_{2c}$ when the pump 120 is redriven, as illustrated in FIGS. 5 and 6.

For example, with reference to FIGS. 5 and 6, when a voltage applied to the pump 120 during an initial driving operation $t_0$ to $t_1$ of the pump 120 is the first voltage $V_1$, the second voltage $V_2$ provided when the pump 120 is redriven after the pump 120 is stopped for a preset period of time $t_1$ to $t_{2a}$ may be higher than the first voltage $V_1$. When the second voltage $V_2$ is increased to be higher than the first voltage $V_1$ as described above, since a higher pressure than that in the case in which the first voltage $V_1$ is applied to the pump 120 is applied to the coffee capsule 140, the blockage phenomenon of the coffee powder 145 may be easily removed.

In addition, the control unit 160 may apply the second voltage $V_2$ to the pump 120 for a preset period of time $t_{2a}$ to $t_{2b}$ when the pump 120 is redriven, and then, may apply a third voltage $V_3$ lower than the second voltage $V_2$ thereto for a remaining time $t_{2b}$ to $t_{2c}$. For example, since the blockage phenomenon may be removed by applying the second voltage $V_2$ higher than the first voltage $V_1$ to the pump 120, a level of the second voltage $V_2$ may not be continuously maintained, and the third voltage $V_3$ lower than the second voltage $V_2$ may be supplied after a preset period of time $t_{2a}$ to $t_{2b}$.

In this case, the third voltage $V_3$ may be set to be equal to a level of the first voltage $V_1$ as illustrated in FIG. 5, or may also be set to be higher than the level of the first voltage $V_1$ as illustrated in FIG. 6.

On the other hand, a case in which the blockage phenomenon occurs even after the pump 120 is redriven after the pump 120 is stopped may be present. For example, in the case in which the blockage phenomenon is not removed even after the pump 120 is redriven, the flow rate sensed by the flow rate sensor 110 may be lower than the preset flow rate.

As described above, at the time of a redriving operation of the pump 120, when the flow rate sensed by the flow rate sensor 110 is lower than the preset flow rate, the control unit 160 may stop the pump 120 for a preset period of time and may then redrive the pump 120. Thus, as illustrated in FIGS. 5 and 6, the pump 120 may be redriven after a preset period of time $t_{2c}$ to $t_{3a}$ has elapsed. In this case, the third voltage $V_3$ lower than the second voltage $V_2$ may be applied for the remaining time $t_{3b}$ to $t_{3c}$ after the second voltage $V_2$ is applied to the pump 120 for the preset time $t_{3a}$ to $t_{3b}$.

On the other hand, in the case in which the flow rate sensed by the flow rate sensor 110 continues to be lower than the preset flow rate even after the pump 120 is redriven, a redriving operation of the pump 120 after the pump 120 is stopped may also continue. However, if the preset flow rate is not reached, even when the pump 120 is redriven a predetermined number of times or more, for example, three times or more, a user wait time may be excessively long, and it may also be difficult to remove the blockage phenomenon of the coffee powder 145 using only the method described above.

Thus, for example, when the number of redriving operations of the pump 120 is equal to or greater than a preset number, the control unit 160 may notify a user of abnormality in a coffee extraction function through the display unit 170. Thus, the user may take measures, such as removing the coffee capsule 140 having abnormality in a coffee extraction function from the coffee extraction unit 150 and installing a new coffee capsule 140 into the coffee extraction unit 150, and the like. In this case, since residual pressure may be present in the coffee capsule 140 even in a state in which the driving of the pump 120 is stopped, a safety accident may occur due to water splashing or the like when the user opens the coffee extraction unit 150. Thus, a process of removing residual pressure inside the coffee capsule 140 through opening of a channel connected to the coffee extraction unit 150, or the like, when the function abnormality is noticed to the user, may be provided.

[Coffee Extraction Method]

Subsequently, a coffee extraction method according to another exemplary embodiment in the present disclosure will be described with reference to FIGS. 1 to 6.

First, a coffee extraction method (S100) illustrated in FIG. 2 as an example will be described with reference to the coffee extraction device 100 of FIG. 1.

Figure 2:
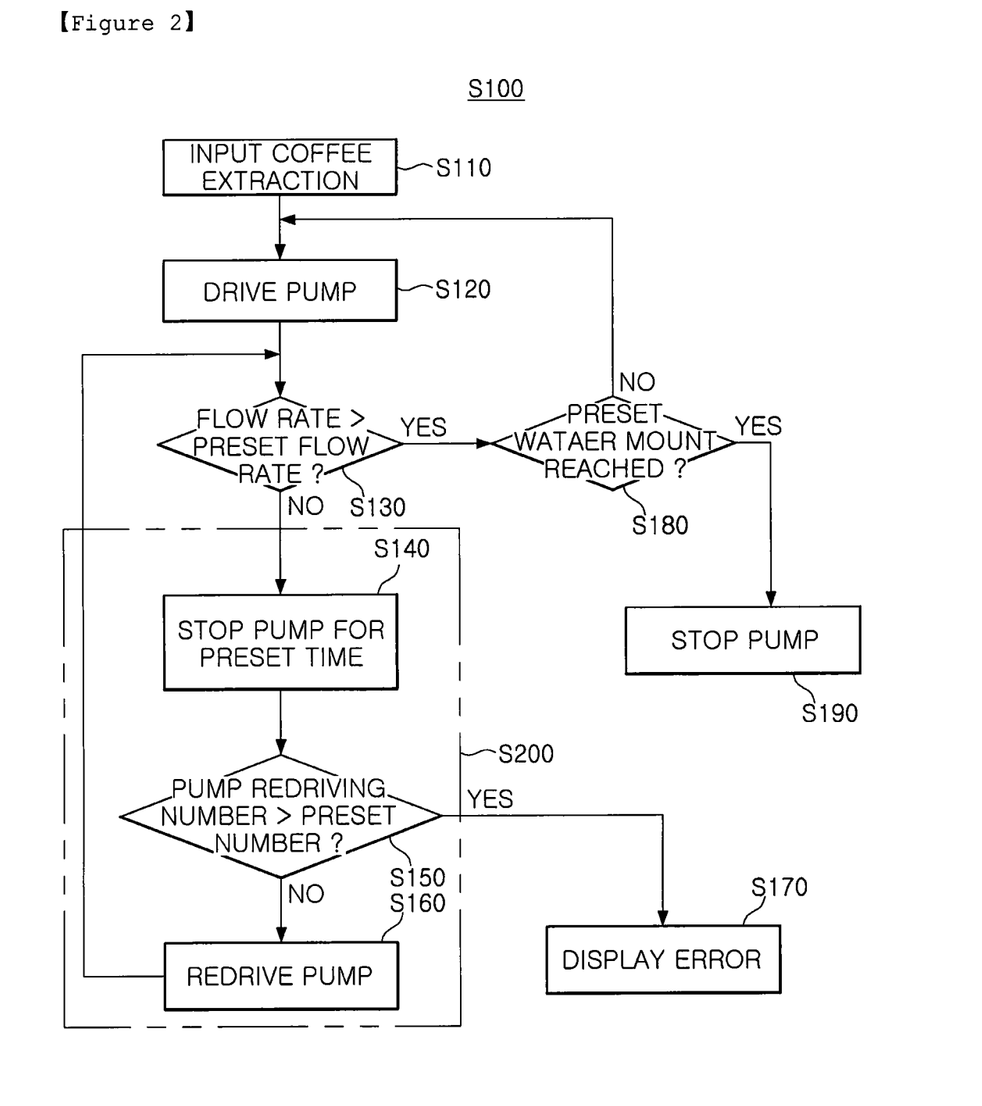
FIG. 2 is a flow chart illustrating a coffee extraction method according to an exemplary embodiment in the present disclosure.

As illustrated in FIG. 2, the coffee extraction method S100 according to an exemplary embodiment may include a pump driving process S120 of driving the pump 120 to supply high-pressure water to the coffee capsule 140, and a re-extraction process (S200) of stopping a driving operation of the pump 120 and performing redriving of the pump 120 when a flow rate of the water supplied to the coffee capsule 140 is lower than a preset flow rate.

For example, when a user selects a coffee extraction button, in other words, when coffee extraction is input in S110, the pump driving process (S120) may be performed under conditions enabling coffee extraction in which, for example, a temperature of the heater 130 is higher than a preset temperature.

When the pump 120 is driven, high-pressure water may be supplied to the coffee extraction unit 150, and liquid coffee may be extracted from the coffee extraction unit 150.

At this time, in the case in which a blockage phenomenon does not occur in the coffee capsule 140, the flow rate sensed by the flow rate sensor 110 may be equal to or higher than the preset flow rate in S130, and liquid coffee may be smoothly extracted from the coffee extraction unit 150. At this time, it may be determined whether a preset water amount has been reached, for example, whether a preset water amount for Americano coffee is greater than a preset water amount for espresso coffee, according to an extracted coffee type in S180. When the water amount does not reach the preset water amount, the driving of the pump 120 may be continuously performed in S120, and when reaching the preset water amount, since the extraction has been completed, the driving of the pump 120 may be stopped in S190.

On the other hand, in the case in which a blockage phenomenon occurs in the coffee capsule 140, the flow rate detected by the flow rate sensor 110 may be lower than the preset flow rate in S130. In this case, even in the case in which the pump 120 is continuously driven, the coffee extraction may not be smooth.

Thus, for example, when the flow rate of water supplied to the coffee capsule 140 is lower than a preset flow rate, the re-extraction process S200 in which the driving of the pump 120 is stopped and redriving of the pump 120 is then performed may be performed.

As illustrated in FIG. 2 by way of example, the re-extraction process S200 may include a process S140 in which the pump 120 is stopped for a preset period of time and a process S160 of redriving the pump 120.

For example, when the driving of the pump 120 is stopped for a preset period of time in S140, pressure applied to the coffee capsule 140 may be lower than a level of pressure before the pump 120 stops. In this state, when the pump 120 is redriven in S160, the level of pressure applied to the coffee powder 145 may be changed, thereby changing a pressure distribution or an arrangement state of powder. Thus, a blockage phenomenon may be removed or a flow path may be formed in a region in which a blockage phenomenon does not occur by performing the pump redriving process (S160) after the pump stop process (S140), thereby providing stable coffee extraction.

In this case, as illustrated in FIGS. 5 and 6, in the pump redriving process S160 of the re-extraction process S200, a second voltage $V_2$ higher than a first voltage $V_1$ applied to the pump 120 during the pump driving process S120 may be applied to the pump 120 for at least a portion $t_{2a}$ to $t_{2b}$ of a voltage application period of time $t_{2a}$ to $t_{2c}$ at the time of a redriving of the pump 120.

In other words, referring to FIGS. 5 and 6, when a voltage applied to the pump 120 during an initial driving operation $t_0$ to $t_1$ of the pump 120 is the first voltage $V_1$, the second voltage $V_2$ provided when the pump redriving process S160 is performed after the pump stop process S140 for a preset period of time $t_1$ to tea may be higher than the first voltage $V_1$. When the second voltage $V_2$ is increased to be higher than the first voltage $V_1$ as described above, since a higher pressure than that in the case in which the first voltage $V_1$ is applied to the pump 120 is applied to the coffee capsule 140, the blockage phenomenon of the coffee powder 145 may be easily removed.

In addition, in the pump redriving process S160 of the re-extraction process S200, the second voltage $V_2$ may be applied to the pump 120 for a preset period of time $t_{2a}$ to $t_{2b}$ when the pump 120 is redriven, and then, a third voltage $V_3$ lower than the second voltage $V_2$ may be applied thereto for a remaining time $t_{2b}$ to $t_{2c}$. For example, since the blockage phenomenon may be removed by applying the second voltage $V_2$ higher than the first voltage $V_1$ to the pump 120, a level of the second voltage $V_2$ may not be continuously maintained, and the third voltage $V_3$ lower than the second voltage $V_2$ may be supplied after a preset time $t_{2a}$ to $t_{2b}$.

In this case, the third voltage $V_3$ may be set to be equal to a level of the first voltage $V_1$ as illustrated in FIG. 5, or may also be set to be higher than the level of the first voltage $V_1$ as illustrated in FIG. 6.

On the other hand, a case in which the blockage phenomenon occurs even after the pump redriving process S160 is performed after the pump stop process S140 may be present. For example, in the case in which the blockage phenomenon is not removed even after the pump redriving process S160, the flow rate sensed by the flow rate sensor 110 may be lower than the preset flow rate.

As such, when the flow rate sensed by the flow rate sensor 110 is lower than the preset flow rate during the pump redriving process S160, in S130, the re-extraction process S200 may be performed, for example, the pump redriving process S160 may be repeated after the pump 120 is stopped for a preset period of time (S140). As illustrated in FIGS. 5 and 6, the pump 120 may be redriven after a preset period of time $t_{2c}$ to $t_{3a}$ has elapsed. Further, in this case, after the second voltage $V_2$ is applied to the pump 120 for the preset period of time $t_{3a}$ to $t_{3b}$, the third voltage $V_3$ lower than the second voltage $V_2$ may be applied for a remaining time $t_{3b}$ to $t_{3c}$.

On the other hand, in the case in which the flow rate sensed by the flow rate sensor 110 continues to be lower than the preset flow rate even after the pump redriving process S160 in S130, the pump redriving process S160 may also be continuously performed after the pump stop process S140. However, if the preset flow rate is not reached, even when the pump 120 is redriven a predetermined number of times or more, for example, three times or more, a user wait time may be excessively long, and it may also be difficult to remove the blockage phenomenon of the coffee powder 145 using only the method described above.

Thus, for example, when the number of times of redriving the pump 120 is equal to or greater than the preset number of times in S150, the user may be notified of abnormality in a coffee extracting function through the display unit 170 in S170. Then, the user may take measures, such as removing the coffee capsule 140 having abnormality in a coffee extraction function from the coffee extraction unit 150 and installing a new coffee capsule 140 into the coffee extraction unit 150, and the like. In this case, since residual pressure may be present in the coffee capsule 140 even in a state in which the driving of the pump 120 is stopped, a safety accident may occur due to water splashing or the like when a user opens the coffee extraction unit 150. Thus, the process S170 of notifying a user of abnormality or error in the extraction function may include a process of removing residual pressure inside the coffee capsule 140 through opening of a channel connected to the coffee extraction unit 150, or the like.

Subsequently, a coffee extraction method (S100a) illustrated as an example in FIG. 3 will be described. The coffee extraction method S100a illustrated in FIG. 3 may be similar to the coffee extraction method S100 illustrated in FIG. 2, except that an initial pump driving process S115 is performed for a preset time before a pump driving process S120.

Thus, a detailed description of configurations the same as or similar to the exemplary embodiment illustrated in FIG. 2 will be omitted, and only differences will be described.

In the initial pump driving process S115, the pump 120 may be initially driven for a preset time to initially supply high-pressure water to the coffee powder 145. For example, in the case in which a blockage phenomenon occurs in the initial pump driving process S115, the blockage phenomenon may be removed in the pump driving process S120 and a re-extraction process S200 to be performed subsequently.

Figure 3:
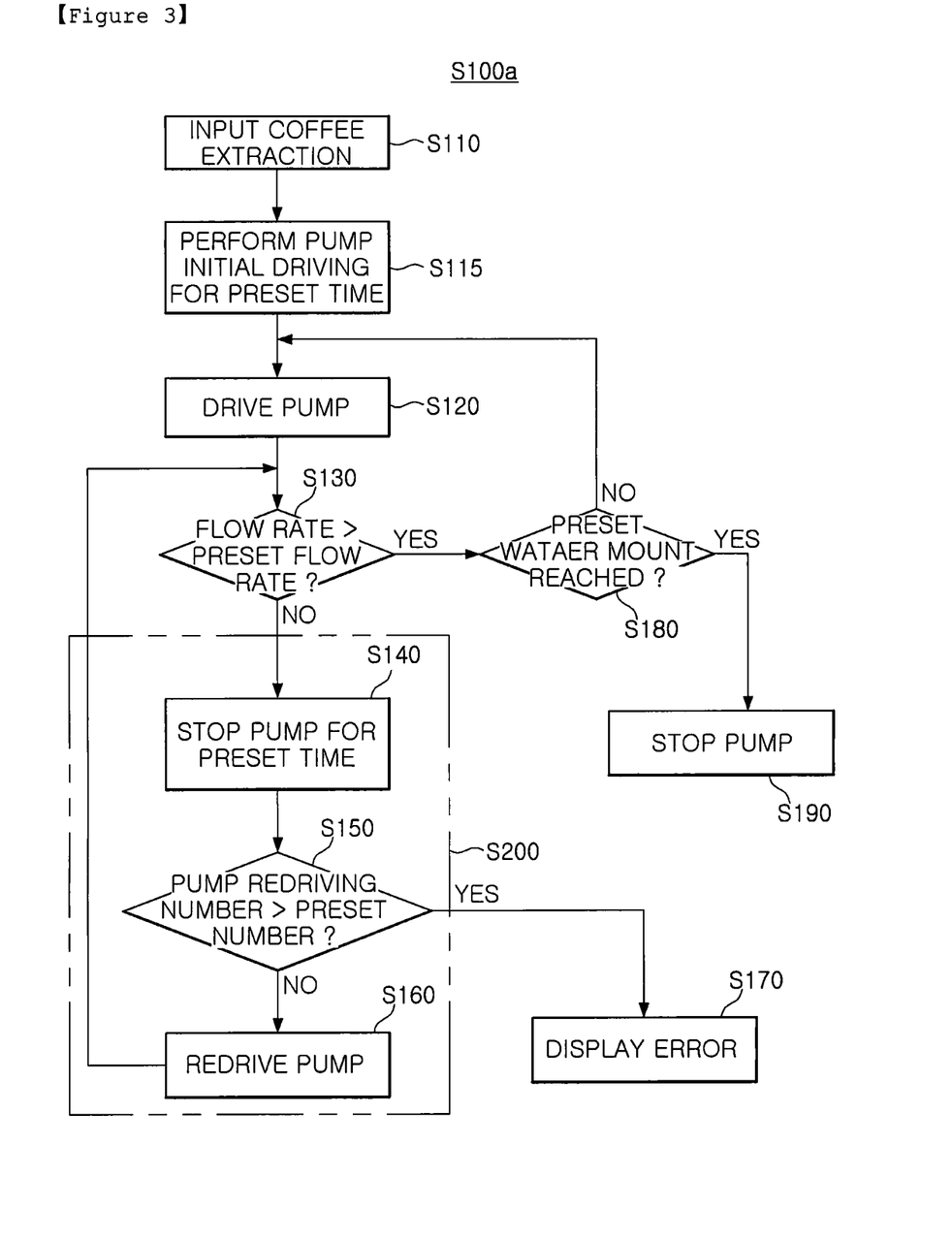
FIG. 3 is a flow chart illustrating a coffee extraction method according to another exemplary embodiment in the present disclosure.

For example, in the case of the exemplary embodiment illustrated in FIG. 3, as the initial pump driving process S115 is further performed, the coffee powder 145 may be more easily removed from a blockage phenomenon.

Further, a coffee extraction method (S100b) illustrated in FIG. 4 as an example will be described below.

Figure 4:
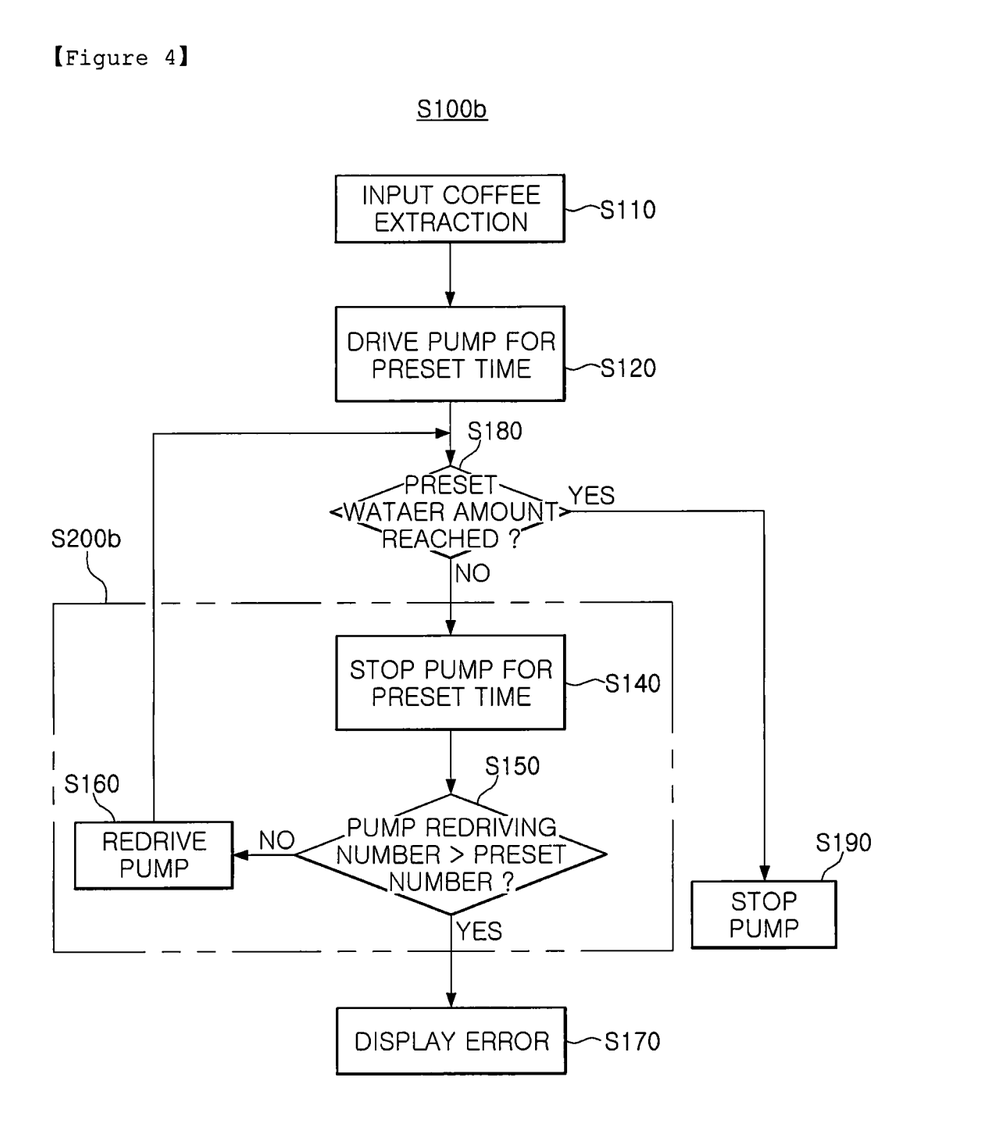
FIG. 4 is a flow chart illustrating a coffee extraction method according to another exemplary embodiment in the present disclosure.

The coffee extraction method S100b illustrated in FIG. 4 has a difference from the exemplary embodiment illustrated in FIG. 2, in that instead of the process S130 of comparing the flow rate sensed by the flow rate sensor 110 with the preset flow rate, a process S180 of determining whether a water amount reaches a preset water amount is performed to thus determine whether or not the re-extraction process S200b is to be performed.

For example, the pump 120 may be driven for a preset time according to a preset water amount based on a type of coffee to be extracted, in S120, and as a water amount supplied to the coffee capsule 140 reaches the preset water amount within a preset time in S180, coffee extraction may be completed. Thus, the driving of the pump 120 may be stopped in S190. In the case in which the water amount supplied to the coffee capsule 140 does not reach the preset water amount in S180, it may be determined that the flow of the coffee powder 145 was blocked, and the re-extraction process (S200b) may be performed.

A detailed configuration of the re-extraction process (S200b) is the same as that of the coffee extraction method S100 illustrated in FIG. 2, and a detailed description thereof will be omitted.

While exemplary embodiments have been shown and described above, it will be apparent to those skilled in the art that modifications and variations could be made without departing from the scope of the present disclosure as defined by the appended claims.

The invention claimed is:

1. A coffee extraction device comprising:
a coffee extraction unit configured to mount a coffee capsule;
a pump configured to pressurize and supply water to the coffee extraction unit;
a flow rate sensor configured to measure a flow rate of the water supplied to the coffee extraction unit; and
a control unit in operative communication with the pump and the flow rate sensor, and configured to:
control the pump, based on the flow rate measured by the flow rate sensor, and
in response to the flow rate measured by the flow rate sensor being less than a preset flow rate while the pump supplies the water to the coffee extraction unit, stop the pump for a predetermined time and then redrive the pump.

2. The coffee extraction device of claim 1, wherein the control unit is configured to control applying a second voltage, higher than a first voltage applied to the pump at the time of initial driving of the pump, to the pump during at least a portion of a voltage application period of time when the pump is redriven.

3. The coffee extraction device of claim 2, wherein the control unit is configured to control applying a third voltage, less than the second voltage, to the pump after applying the second voltage to the pump for a preset period of time, when the pump is redriven.

4. The coffee extraction device of claim 3, wherein the third voltage has a level equal to or higher than a level of the first voltage.

5. The coffee extraction device of claim 1, wherein the control unit is configured to stop the pump for a preset period of time and then redrive the pump, when the flow rate sensed by the flow rate sensor is less than the preset flow rate at the time of redriving of the pump.

6. The coffee extraction device of claim 5, wherein when the number of redriving operations of the pump is equal to or greater than a preset number, the control unit is configured to control notifying a user of abnormality in a coffee extraction function.

7. The coffee extraction device of claim 1, further comprising a heater installed on a flow path between the pump and the coffee extraction unit to heat the water supplied to the coffee extraction unit.

* * * * *